Aug. 29, 1950 J. DOBRY ET AL 2,520,387
HARDNESS TESTING DEVICE
Filed Jan. 15, 1947 Fig.1 2 Sheets-Sheet 1

Patented Aug. 29, 1950

2,520,387

UNITED STATES PATENT OFFICE 2,520,387

HARDNESS TESTING DEVICE

Jaroslav Dobrý and Antonín Möstl, Kladno, Czechoslovakia, assignors to Spojene Ocelarny, Narodni podnik, Prague, Czechoslovakia, a company of Czechoslovakia Application January 15, 1947, Serial No. 722,122
In Czechoslovakia January 15, 1946

1 Claim. (Cl. 73—81)

This invention relates to devices for determining the hardness of materials of the type in which a diamond pyramid is used for producing the testing impression.

Hardness testers (ball pressure testing apparatus and hardness meters with diamond tips) hitherto known are limited in their possibilities of application because they are large and heavy, and generally unsuitable for the testing of bulky objects or can not be used at all points thereof.

The object of the invention is to provide a hardness testing apparatus which, while fully maintaining its precision, is easy to carry and handy to use and can be employed at any point on objects of any shape, even very bulky ones.

According to the invention a device for testing the hardness of materials comprises a unit to be removably secured in a holder therefor, and having an open ended guide sleeve with an internal abutment, at each end, a head having a diamond pyramid at one end and its other end engaged behind the abutment in one open end of the sleeve, a plunger slidably mounted in the other end of the sleeve and engageable with the adjacent abutment therein, a helical compression spring mounted between the said head and the plunger, and hand-operable means for displacing the plunger towards the head.

For the regulation of the pressure exerted on the specimen the displacement of the plunger towards the head may be limited by means of a stop on the plunger outside the sleeve which may abut against one end of the sleeve. The stop may be adjustable and may comprise a nut threaded on a threaded portion of the plunger.

One form of hardness tester according to the invention will now be described by way of example, with reference to the accompanying drawings wherein.

Figure 1:
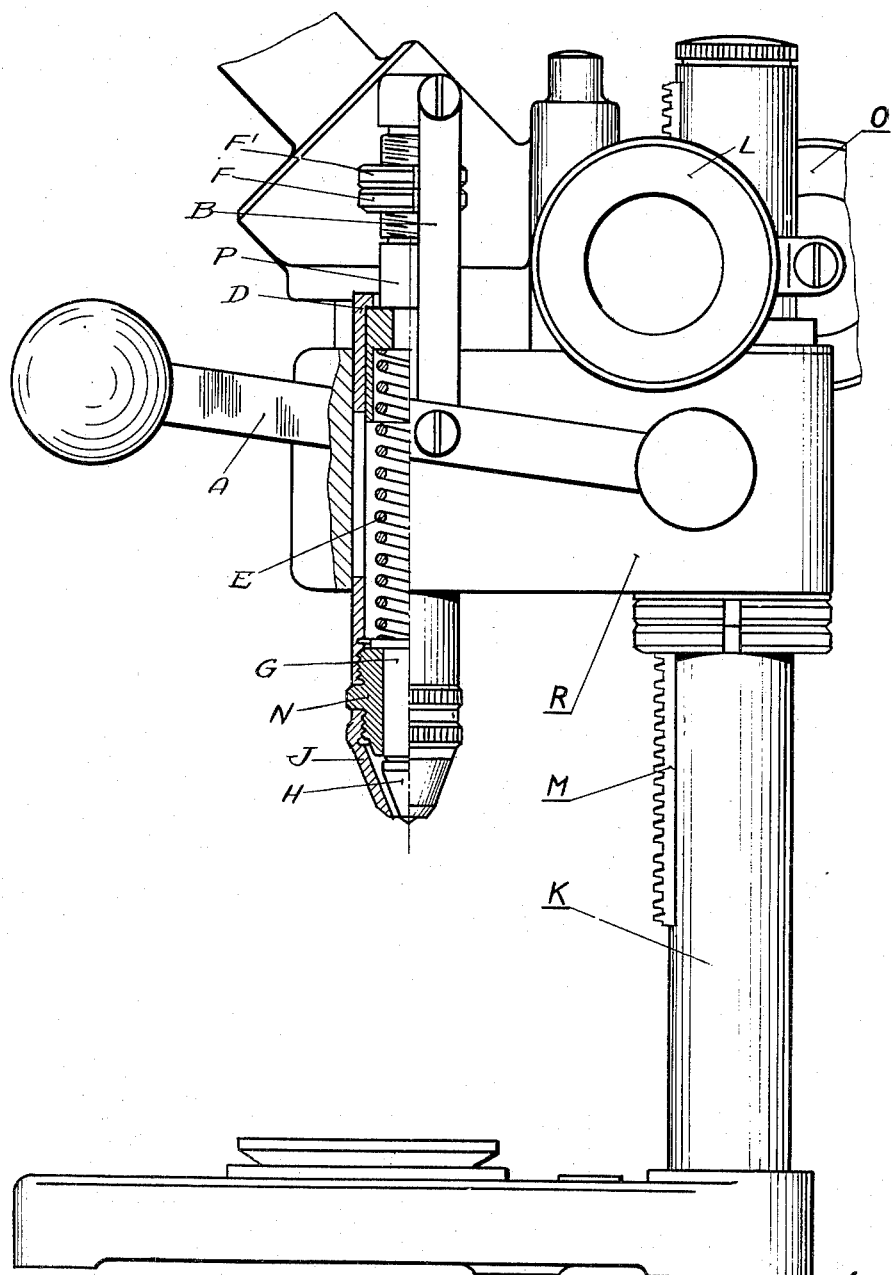
Figure 1 is a side view partly in section of a normal hardness testing apparatus with a testing unit according to the invention.

In an open ended guide sleeve D is mounted a helical compression spring E which is compressed, in the arrangement shown in Figure 1, by a hand lever A and connecting rod B acting on a plunger P normally held by the spring against an internal abutment S at one open end of the sleeve, until a nut F threaded on the plunger abuts against the upper end of the sleeve D. The plunger P has a collar T on its lower end which is normally held by the compression spring E against the abutment S to limit upward movement of the plunger relative to guide sleeve D. By adjustment of the nut F it is possible to alter the magnitude of the compression of the helical spring E and thereby the magnitude of the exerted testing load as desired, continuously, up to a load of for example 30 kg. The nut F is secured in its adjusted position by a lock nut $F^1$.

The compression spring E acts on a pressure head or block G, into which there is screwed the holder H for the diamond pyramid. The head G is mounted in a guide N which is screwed into the other open end of the sleeve, and constitutes an internal abutment of the sleeve against which the head is held by the spring. A shield J for the pyramid holder H is secured on the guide N.

The guide sleeve D, the compression spring E, the plunger P with the nut F, and the lock nut $F^1$, the head G with the holder H and the guide N, are removably mounted as a unit in the arm R of the hardness testing apparatus (Fig. 1). The arm R is adjustable in height on a stand K by means of a rack M and a hand wheel L, and may be secured in position by the clamp O.

Figure 2:
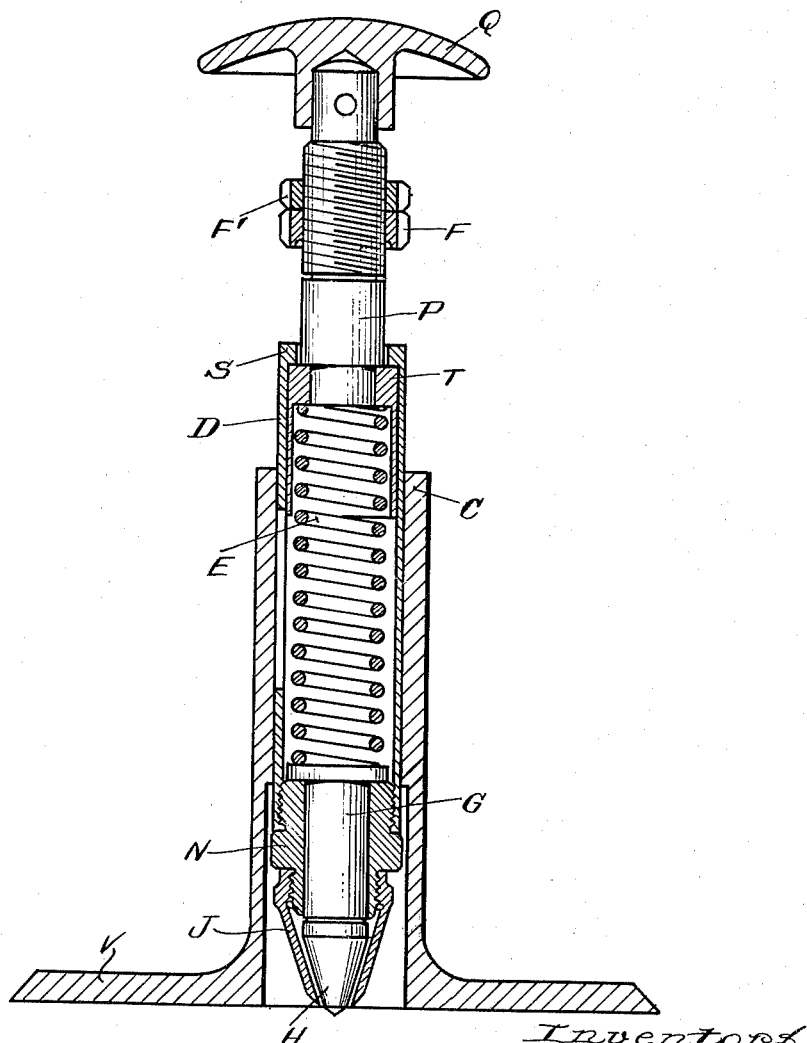
Figure 2 is a section of a tubular stand with the testing unit.

In the arrangement shown in Figure 2 of the drawing the guide sleeve E and parts carried thereby are mounted in a tubular stand C having a bottom flange V. The helical compression spring E is compressed by a knob Q on the plunger P. The bottom flange V on the tubular stand C can be applied to any desired point of an object to be tested in any desired position, for example on a vertical surface, in order to carry out a hardness test there.

The hardness testing apparatus according to the present invention presents a number of advantages as against the test apparatuses of the hitherto familiar constructions. Furthermore, the advantages offered by the present invention could hitherto be attained only with devices giving inaccurate results. The apparatus according to the invention is very simple and the production cost comparatively small. The whole apparatus may be packed in a small trunk, it may be mounted on any office desk, and in spite of all these advantages it can be used for testing objects even of the largest sizes. A further advantage is constituted by the fact that the adjusted testing position according to the height of the object to be tested may be secured which is important in the case of unilaterally supported or bulky objects. All the above mentioned advantages, and more particularly the low production cost of the apparatus according to the present invention, enable its use even in small plants contributing thus to rational utilisation of raw materials.

Having now fully described our invention, what we claim as new and useful and desire to secure by Letters Patent of the United States is:

In an apparatus for determining the hardness of objects, a tubular holder open at both ends, a guide sleeve slidable in the tubular holder, a plunger slidably mounted in said guide sleeve and projecting from the top of the latter, said plunger having screw threads on the projecting portion, a nut threaded on the projecting portion of said plunger and engageable with said guide sleeve, an actuating member at the top of said plunger, a stop on said guide sleeve limiting upward movement of the plunger therein, means carried by the plunger for engaging the stop on the guide sleeve, a pressure block secured at the bottom of the guide sleeve, and a spring in said guide sleeve confined between the plunger and said pressure block.

JAROSLAV DOBRÝ
ANTONÍN MÖSTL.

REFERENCES CITED

The following references are of record in the file of this patent:

UNITED STATES PATENTS

| Number | Name | Date |
|---|---|---|
| 660,445 | Lillicrap | Oct. 23, 1900 |
| 1,413,305 | Webb | Apr. 18, 1922 |
| 1,519,602 | Zimmerman et al. | Dec. 16, 1924 |
| 1,661,718 | Davis | Mar. 6, 1928 |
| 2,018,593 | Arthuis | Oct. 22, 1935 |
| 2,041,869 | Smith et al. | May 26, 1936 |

FOREIGN PATENTS

| Number | Country | Date |
|---|---|---|
| 280,292 | Great Britain | Nov. 14, 1927 |
| 628,161 | Germany | Mar. 28, 1936 |